(12) United States Patent
Lim (10) Patent No.: US 10,148,582 B2
(45) Date of Patent: Dec. 4, 2018

(54) MANAGING BUFFERS FOR RATE PACING (71) Applicant: Samsung Electronics Co., Ltd, Suwon-si (KR)

(72) Inventor: Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 15/415,840

(22) Filed: Jan. 25, 2017

(65) Prior Publication Data

US 2017/0346745 A1 Nov. 30, 2017

Related U.S. Application Data

(60) Provisional application No. 62/340,826, filed on May 24, 2016.

(51) Int. Cl.
*H04L 12/819* (2013.01)
*H04L 12/927* (2013.01)
*H04L 12/801* (2013.01)

(52) U.S. Cl.
CPC ............. *H04L 47/21* (2013.01); *H04L 47/34* (2013.01); *H04L 47/801* (2013.01)

(58) Field of Classification Search
CPC ........ H04L 47/21; H04L 47/801; H04L 47/34
See application file for complete search history.

(56) References Cited

U.S. PATENT DOCUMENTS

| 2003/0106069 | A1 | 6/2003 | Crinon |
| 2006/0190593 | A1 | 8/2006 | Wang et al. |
| 2012/0004960 | A1* | 1/2012 | Ma ..................... G06Q 30/0241 705/14.4 |
| 2015/0067137 | A1 | 3/2015 | VerSteeg et al. |
| 2015/0281799 | A1 | 10/2015 | Lim |
| 2016/0057065 | A1* | 2/2016 | Briscoe ................. H04L 47/624 370/235 |
| 2016/0182387 | A1* | 6/2016 | Briscoe ................... H04L 47/26 370/235 |
| 2016/0191595 | A1* | 6/2016 | Poornachandran ... H04L 65/607 709/219 |
| 2017/0242611 | A1* | 8/2017 | Callahan ............... G06F 3/0604 |

FOREIGN PATENT DOCUMENTS

| JP | 200533841 | 2/2005 |
| JP | 2005-322995 A | 11/2005 |
| WO | 2015076694 A1 | 5/2015 |

OTHER PUBLICATIONS

ISA/KR, "International Search Report," Application No. PCT/KR2017/005339, dated Aug. 21, 2017, 3 pages.
ISA/KR, "Written Opinion of the International Searching Authority," Application No. PCT/KR2017/005339, dated Aug. 21, 2017, 4 pages.

* cited by examiner

Primary Examiner — Brian D Nguyen (57) ABSTRACT

A method, decoder and server for managing buffers for rate pacing. The decoder includes a memory, a transceiver configured to transmit and receive a signal, and processing circuitry operably connected to the memory and the transceiver. The processing circuitry receives, from the server, a removal rate message indicating a drain rate of a pacing buffer of the decoder. The processing circuitry also provides packets from the pacing buffer to a decoding buffer of the decoder according to the drain rate.

20 Claims, 5 Drawing Sheets

MANAGING BUFFERS FOR RATE PACING

CROSS-REFERENCE TO RELATED APPLICATIONS AND CLAIM OF PRIORITY

This application claims priority under 35 U.S.C. § 119(e) to U.S. Provisional Patent Application No. 62/340,826 filed May 24, 2016 entitled "MANAGING BUFFERS FOR RATE PACING." The above-identified provisional patent application is hereby incorporated by reference in its entirety.

TECHNICAL FIELD

The present application relates generally to media data delivery in a transmission system and, more specifically, to manage a buffer for rate pacing.

BACKGROUND

Moving Picture Experts Group (MPEG) media transport (MMT) is a digital container standard or format that specifies technologies for the delivery of coded media data for multimedia service over heterogeneous IP network environments. The delivered coded media data includes both audio-visual media data requiring synchronized decoding and presentation of a specific unit of data in a designated time, namely timed data, and other types of data that are decoded and presented in an arbitrary time based on the context of service or interaction by the user, namely non-timed data.

MMT is designed under the assumption that the coded media data will be delivered through a packet-based delivery network using Internet Protocols (IPs), such as real-time transport protocol (RTP), transmission control protocol (TCP), user datagram protocol (UDP), etc. MMT is also designed with consideration for characteristics of different delivery environments. For example, the end-to-end delay of delivery of each packet from a sending entity to a receiving entity may not always be constant, and the underlying network providers must provide a way to distinguish signaling messages from the media data. Accordingly, there is a need for improved standards in MMT media data delivery.

SUMMARY

Embodiments of the present disclosure provide a decoder, method for the decoder and server for controlling delivery of media data in a transmission system.

In one embodiment, a decoder for managing buffers for rate pacing is provided. The decoder includes a memory, a transceiver configured to transmit and receive a signal, and processing circuitry operably connected to the memory and the transceiver. The processing circuitry transmits, to a server, a removal rate message indicating a drain rate of a pacing buffer of the decoder. The processing circuitry then provides packets from the pacing buffer to a decoding buffer of the decoder according to the drain rate.

In one embodiment, a method of a decoder for managing buffers for rate pacing is provided. The method includes transmitting, to a server, a removal rate message indicating a drain rate of a pacing buffer of the decoder. The message also includes providing packets from the pacing buffer to a decoding buffer of the decoder according to the drain rate.

In one embodiment, a server for managing buffers for rate pacing in a decoder is provided. The server includes a memory, a transceiver configured to transmit and receive signals, and one or more processors operably connected to the memory and the transceiver.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

MMT coding and media delivery is discussed in the following document and standards description: ISO/IEC JTC 1/SC29/WG11, High efficiency coding and media delivery in heterogeneous environments—Part 1: MPEG Media Transport (MMT), July 2012, which is hereby incorporated into the present disclosure as if fully set forth herein. For efficient and effective delivery of coded media data over heterogeneous IP network environments, MMT provides: a logical model to construct a content composed of various components for mash-up applications; the structure of data conveying information about the coded media data for the delivery layer processing, such as packetization and adaptation; a packetization method and packet structure to deliver media content agnostic to a specific type of media or coding method used over TCP or UDP, including hybrid delivery; a format of signaling messages to manage presentation and delivery of media content; a format of signaling messages to manage presentation and delivery of media content; a format of information to be exchanged across the layers to facilitate cross layer communication.

MMT defines three functional areas including encapsulation, delivery, and signaling. The encapsulation functional area defines the logical structure of media content, the MMT package, and the format data units to be processed by an MMT compliant entity. An MMT package specifies components including media content and the relationship among the media content to provide information needed for adaptive delivery. The format of the data units is defined to encapsulate the coded media to either be stored or carried as a payload of a delivery protocol and to be easily converted between storage and carrying. The delivery functional area defines the application layer protocol and format of the payload. The application layer protocol provides enhanced features, including multiplexing, for delivery of the MMT package compared to conventional application layer protocols for the delivery of multimedia. The payload format is defined to carry coded media data that is agnostic to the specific media type or encoding method. The signaling functional area defines the format of messages to manage delivery and consumption of MMT packages. Messages for consumption management are used to signal the structure of the MMT package, and messages for delivery management are used to signal the structure of payload format and configuration of the protocol.

MMT defines a new framework for delivery of time continuous multimedia, such as audio, video, and other static content, such as widgets, files, etc. MMT specifies a protocol (i.e., MMTP) for the delivery of an MMT package to a receiving entity. The MMTP signals transmission time of the MMTP package as part of the protocol header. This time enables the receiving entity to perform de-jittering by examining the transmission time and reception time of each incoming MMT packet.

Embodiments of the present disclosure recognize that environmental conditions for receipt of media data may differ based on the transmission path, transmission formats, and the types of recipient devices resulting in delay between transmission and delivery (e.g., end-to-end delay). For example, different transmission media (e.g., wireless data communication (LTE, HSPA, 3G, WiFi, etc.), physical media (e.g., wireline, cable, Ethernet, optical fiber, etc.) satellite broadcast, etc.) have different associated transmission delays. Embodiments of the present disclosure recognize that, in addition to transmission delay, other sources may result in jitter. For example, forward error correction (FEC) decoding may insert additional delay to enable the recovery of lost packets, which requires receipt of sufficient source and parity packets. Yet other sources of delay could be due to data interleaving that may have been performed during transmission. Embodiments of the present disclosure also recognize that recipient device components may also impact delay. Devices, such as computers, with larger memories and faster processing abilities may have less delay than other devices, such as set-top boxes, with smaller memories and slower processing abilities.

Embodiments of the present disclosure recognize that, in certain environments, such as broadcast environments, it is important to have a fixed end-to-end delay that each transmitted packet experiences the same delay across a point-to-multipoint transmission system from transmission until leaving the MMT processing stack at the receiving entity. For example, embodiments of the present disclosure recognize that it is important to provide or guarantee that all clients receiving the same program present the same content at the same time agnostic to device, protocol, or transmission media implementation. In addition, in order to enable hardware realization of receivers, embodiments of the present disclosure recognize that an upper bound on the required memory space to ensure the fixed packet delivery delay may need to be provided. Depending on the nature of the network and the setup of the service, MMT packets may be exposed to a wide range of jitter, which would then result in different buffer requirements. For example, a service that offers FEC protection on large source blocks and which is carried over the Internet may require more buffering than a service that is carried over a managed broadcast and without FEC protection.

Therefore, when the variation of the amount of the jitter is so large or the largest amount of the jitter cannot be known to an MMT sending entity, the current MMTP HRBM cannot be an efficient solution. For those cases, an MMT sending entity will simply deliver the packets at its maximum available bandwidth without incorporating the HRBM so that the MMT receiving entity can buffer the data for some time before consumption and data buffered at the beginning can be consumed when the packets are not received in time.

Accordingly, embodiments of the present disclosure provide a method and apparatus to provide, pacing and signaling messages for an MMT sending entity and an MMT receiving entity to manage the level of a pacing buffer efficiently.

Figure 1:
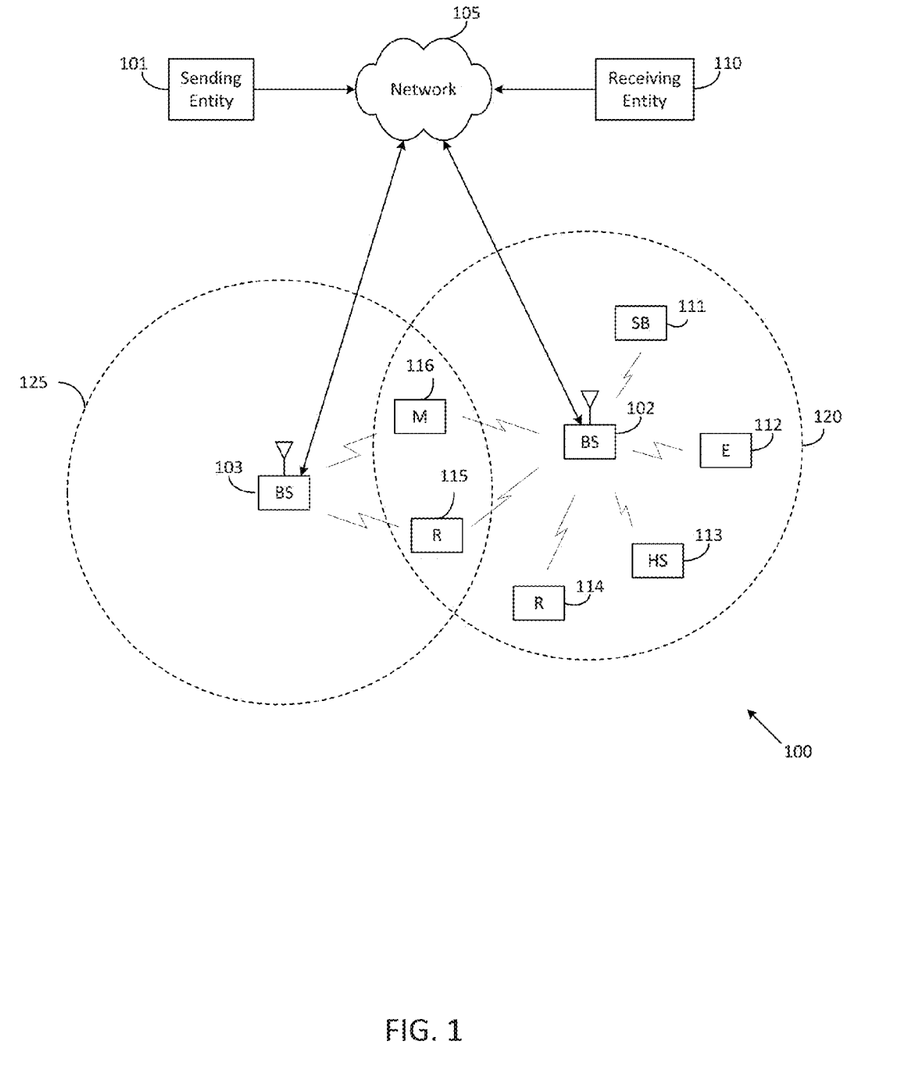
FIG. 1 illustrates an example of a transmission system in which various embodiments of the present disclosure may be implemented.

FIG. 1 illustrates an example of a transmission system 100 in which various embodiments of the present disclosure may be implemented. In the illustrated embodiment, the system 100 includes a sending entity 101, a network 105, receiving entities 110-116, wireless transmission points (e.g., an Evolved Node B (eNB), and Node B), such as base station (BS) 102, base station (BS) 103, and other similar base stations or relay stations. Sending entity 101 is in communication with base station 102 and base station 103 via network 105 that may be, for example, the Internet, a media broadcast network, or IP-based communication system. Receiving entities 110-116 are in communication with sending entity 101 via network 105 and/or base stations 102 and 103.

Base station 102 provides wireless access to network 105 to a first plurality of receiving entities (e.g., user equipment, mobile phone, mobile station, and subscriber station) within coverage area 120 of base station 102. The first plurality of receiving entities includes user equipment 111, which may be located in a small business (SB); user equipment 112, which may be located in an enterprise (E); user equipment 113, which may be located in a WiFi hotspot (HS); user equipment 114, which may be located in a first residence (R); user equipment 115, which may be located in a second residence (R); and user equipment 116, which may be a mobile device (M), such as a cell phone, a wireless communication enabled laptop, a wireless communication enabled PDA, a tablet computer, or the like.

Base station 103 provides wireless access to network 105 to a second plurality of user equipment within coverage area 125 of base station 103. The second plurality of user equipment includes user equipment 115 and user equipment 116. In an exemplary embodiment, base stations 101-103 may communicate with each other and with user equipment 111-116 using OFDM or OFDMA techniques.

While only six user equipments are depicted in FIG. 1, it is understood that system 100 may provide wireless broadband and network access to additional user equipment. It is noted that user equipment 115 and user equipment 116 are located on the edges of both coverage area 120 and coverage area 125. User equipment 115 and user equipment 116 each communicate with both base station 102 and base station 103 and may be said to be operating in handoff mode, as known to those of skill in the art.

User equipment 111-116 may access voice, data, video, video conferencing, and/or other broadband services via network 105. In an exemplary embodiment, one or more of user equipment 111-116 may be associated with an access point (AP) of a WiFi WLAN. User equipment 116 may be any of a number of mobile devices, including a wireless-enabled laptop computer, personal data assistant, notebook, handheld device, or other wireless-enabled device. User equipment 114 and 115 may be, for example, a wireless-enabled personal computer (PC), a laptop computer, a gateway, or another device.

Figure 2:
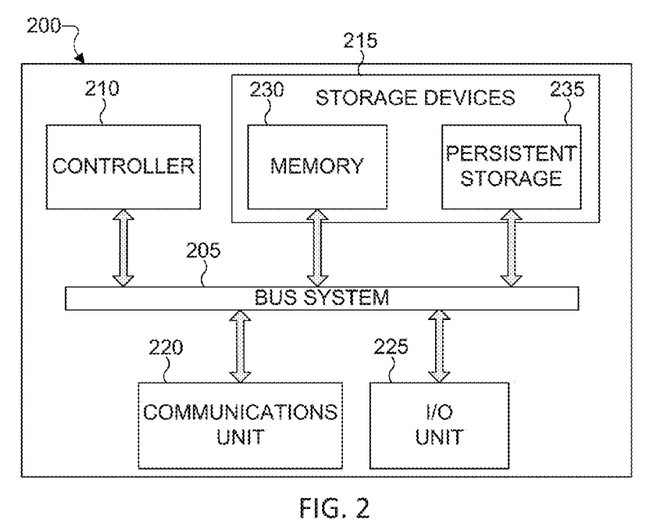
FIGS. 2 and 3 illustrate example devices in a computing system according to various embodiments of the present disclosure.
Figure 3:
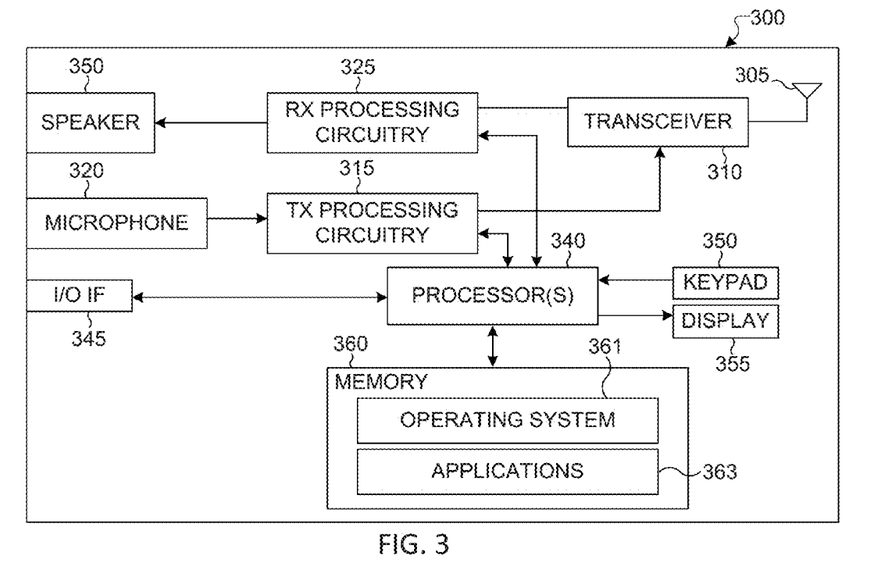

FIGS. 2 and 3 illustrate example devices in a computing system according to this disclosure. In particular, FIG. 2 illustrates an example server 200, and FIG. 3 illustrates an example client device 300. The server 200 could represent the sending entity 101, base station 102, or base station 103 in FIG. 1, and the client device 300 could represent the receiving entity 110 one or more of the user equipments 111-116 in FIG. 1.

As shown in FIG. 2, the server 200 includes a bus system 205, which supports communication between one or more processors 210, at least one storage device 215, at least one communication interface 220, and at least one input/output (I/O) unit 225.

The processor(s) 210 execute instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry. The processor(s) 210 is configured to manage buffers for rate pacing.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, flash memory, or optical disc.

The communication interface 220 supports communications with other systems or devices. For example, the communication interface 220 could include a network interface card or a wireless transceiver facilitating communications over the network 102. The communication interface 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In this illustrative embodiment, server 200 may implement an apparatus that provides for managing buffers for rate pacing in receiving entity 110 or user equipments 111-116, as will be discussed in greater detail below. Note that while FIG. 2 is described as representing the sending entity 101, base station 103, or base station 102 of FIG. 1, the same or similar structure could be used in the receiving entity 110 one or more of the user equipments 111-116. For example, a laptop or desktop computer could have the same or similar structure as that shown in FIG. 2.

As shown in FIG. 3, the client device 300, such as a receiving entity 110 or a UE 111-116, includes an antenna 305, a radio frequency (RF) transceiver 310, transmit (TX) processing circuitry 315, a microphone 320, and receive (RX) processing circuitry 325. The client device 300 also includes a speaker 330, one or more processors 340, an input/output (I/O) interface (IF) 345, a touchscreen 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor(s) 340 for further processing (such as for web browsing data).

The TX processing circuitry 315 receives analog or digital voice data from the microphone 320 or other outgoing baseband data (such as web data, e-mail, or interactive video game data) from the processor(s) 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor(s) 340 can include one or more processors or other processing devices and execute the basic OS program 361 stored in the memory 360 in order to control the overall operation of the client device 300. For example, the processor(s) 340 could control the reception of forward channel signals and the transmission of reverse channel signals by the RF transceiver 310, the RX processing circuitry 325, and the TX processing circuitry 315 in accordance with well-known principles. In some embodiments, the processor(s) 340 includes at least one microprocessor or microcontroller.

The processor(s) 340 is also capable of executing other processes and programs resident in the memory 360, such as operations for managing buffers for rate pacing. The processor(s) 340 can move data into or out of the memory 360 as required by an executing process. In some embodiments, the processor(s) 340 is configured to execute the applications 362 based on the OS program 361 or in response to signals received from external devices or an operator. The processor(s) 340 is also coupled to the I/O interface 345, which provides the client device 300 with the ability to connect to other devices such as laptop computers and handheld computers. The I/O interface 345 is the communication path between these accessories and the processor(s) 340.

The processor(s) 340 is also coupled to the touchscreen 350 and the display 355. The operator of the client device 300 can use the touchscreen 350 to enter data into the client device 300. The display 355 may be a liquid crystal display or other display capable of rendering text and/or at least limited graphics, such as from web sites.

The memory 360 is coupled to the processor(s) 340. Part of the memory 360 could include a random access memory (RAM), and another part of the memory 360 could include a flash memory or other read-only memory (ROM).

As will be discussed in greater detail below, in this illustrative embodiment, client device 300 implements an apparatus that can initiate or receive an incoming call to or from sending entity 101, base station 102, or base station 103 over network 105. Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor(s) 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
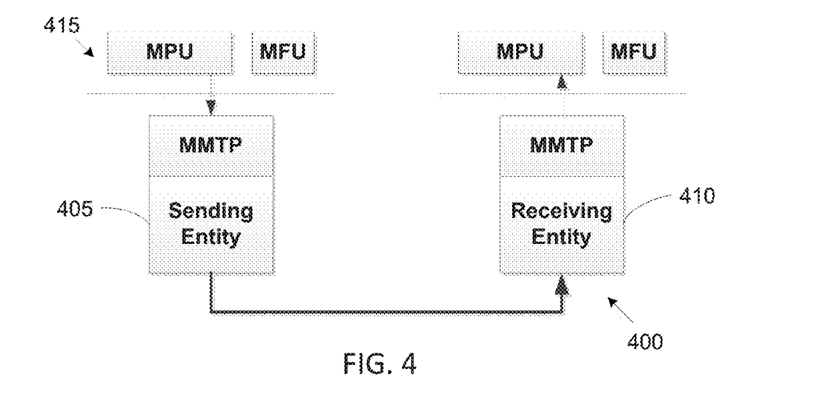
FIG. 4 illustrates a block diagram of MMT protocol input/output in an MMT media data transmission environment in accordance with various embodiments of the present disclosure.

FIG. 4 illustrates a block diagram of MMT protocol input/output in an MMT media data transmission environment 400 in accordance with various embodiments of the present disclosure. In this illustrative example, a sending entity 405 sends media data over a transmission medium to a receiving entity 410 according to MMTP. The media data 415 is processed at the sending entity 405 according to MMTP. For example, the sending entity 405 may perform MMT package encapsulation, coding, delivery, and signaling for the media data as MMT processing units (MPUs) and MMT fragmentation units (MFUs) 415 (e.g., fragments of an MPU). The processed media data is then sent (e.g., as packets) to the receiving entity 410 for processing (e.g., de-capsulation, decoding, etc.) according to MMTP. The media data processed at the receiving entity 410 is then passed up to an upper layer programming (e.g., an application layer program, such as a media player) as MPUs and/or MFUs for presentation to a user completing delivery of the media data.

Figure 5:
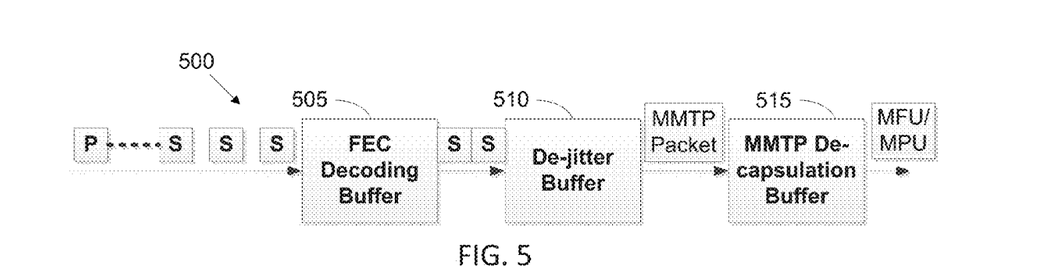
FIG. 5 illustrates a block diagram of a receiver buffer model for simulating the receiver behavior in accordance with various embodiments of the present disclosure.

FIG. 5 illustrates a block diagram of a receiver buffer model 500 for simulating the receiver behavior at the sender side and for estimating a buffer delay and size requirement in accordance with various embodiments of the present disclosure. In various embodiments of the present disclosure, a sending entity 405, such as a media-delivery server (or other MMT aware node), calculates, determines, and/or identifies a fixed end-to-end delay for media data delivery in the point-to-multipoint transmission system. For example, the sending entity 405 may utilize model 500 to determine effects of media data processing performed on the packet stream on reception constraints in a receiver of a receiving entity 410. For example, the sending entity 405 may utilize the model to determine a required buffering delay and a required buffer size and communicate this information to entities receiving the media data.

In this illustrative example, the FEC decoding buffer 505 is a model for estimating a delay and/or buffer size requirement associated with FEC decoding. FEC decoding is typical for many applications, where lower layer transmission may not be sufficient to recover from channel errors or when network congestion may cause packet drops or excessive delays. To perform FEC decoding, the receiving entity 410 uses a buffer where incoming packets are stored until sufficient source ("S") and repair data ("P" parity data) is available to perform FEC decoding.

In this illustrative example, the sending entity 405 uses the model of the FEC decoding buffer 505 to determine actions that the receiving entity 410 would take regarding FEC decoding to estimate the delay associated with FEC decoding. In other words, the sending entity 405 uses the model of the FEC decoding buffer 505 to predict actions taken by the receiving entity 410 to estimate FEC decoding delay. This modeling of the FEC decoding buffer 505 by the sending entity 405 starts with the FEC decoding buffer 505 being assumed to be initially empty. Next, for each incoming packet i with transmission timestamp $t_s$, the receiving entity 410 buffers the packet i using the FEC decoding buffer 505, if buffer_occupancy+packet_size<max_buffer_size. Otherwise, the receiving entity 410 discards packet i as being non-conformant with the buffer model. The receiving entity 410 then determines if FEC is applied to packet i. If FEC is applied to packet i, the receiving entity 410 determines source block j to which packet i belongs, determine the insertion time t of a first packet of source block j, at time t+FEC_buffer_time moves all packets (after FEC correction, if needed) of source block j to the de-jitter buffer, and discards the repair packets. The sending entity 405 utilizes the FEC_buffer_time as the required buffer time for FEC decoding from the reception of the first packet of a source block and until FEC decoding is attempted. This time is typically calculated based on the FEC block size.

The de jitter buffer 510 is a model used by the sending entity to estimate a delay and/or buffer size requirement associated with de-jittering of packets, i.e. removal of the delay jitter of packets. The de-jitter buffer ultimately ensures that MMTP packets experience a fixed transmission delay from source to the output of the MMTP protocol stack, assuming a maximum transmission delay. The receiving entity 410 may discard data units that experience a transmission delay larger than the maximum transmission delay as being very late.

This modeling of the de-jitter buffer 510 by the sending entity 405 starts with the de-jitter buffer being assumed to be initially empty. The receiving entity 410 then inserts an MMTP packet in the de-jitter buffer 510 as the packet arrives. The receiving entity 410 then removes the MMTP packet at time $t_s+\Delta$, where $t_s$ is the transmission timestamp of the MMTP packet and $\Delta$ is the fixed end-to-end delay that is signaled for the media data. After the de-jittering is applied, all MMTP packets that arrived correctly (or were recovered through FEC/retransmissions) will have experienced the same end-to-end delay.

The MMTP de-capsulation buffer 515 is a model used by the sending entity to estimate a delay and/or buffer size requirement associated with MMTP processing before passing the output to the upper layers. The output of the MMTP processor may either be the MFU payload (in low-delay operation), a complete movie fragment, or a complete MPU. MPUs may be fragmented into smaller packets or aggregated into larger packets, depending on their size. The de-capsulation (removal of the MMTP packet and payload headers) and any required de-fragmentation/de-aggregation of the packets is then performed as part of the MMTP processing. This procedure may require some buffering delay, called de-capsulation delay, to perform assembly when an MPU is fragmented into multiple MMTP packets. However, in this illustrative embodiment, de-capsulation delay may not be considered as part of the fixed end-to-end delay, and the availability of an MPU for consumption by the coded media layer can be guaranteed by the entity fragmenting the MPU into multiple MMTP packets, regardless of the de-capsulation delay.

The MMTP HRBM enables an MMT sending entity to precisely manage the status of the buffers of an MMT receiving entity. By using the MMTP HRBM seamless low delay consumption of media services is guaranteed, even when there is large amount of jitter in the underlying delivery network. For its operation, the MMTP HRBM requires one parameter to be known to an MMT sending entity beforehand, overall fixed end-to-end delay of the underlying delivery network. As shown the FIG. 1, the MMTP HRBM consists of three buffers and there are two contributing factors of fixed end-to-end delay, the delay caused by FEC operation and the jitter caused by the bandwidth fluctuation of underlying delivery network. Considering the amount of delay caused by FEC operation is decided by the MMTP sending entity, knowing the amount of fixed end-to-end delay means that knowing the largest amount of jitter of the underlying delivery network.

Therefore, when the variation of the amount of the jitter is so large or the largest amount of the jitter cannot be known to an MMT sending entity, the current MMTP HRBM cannot be an efficient solution. For those cases, an MMT sending entity will simply deliver the packets at its maximum available bandwidth without incorporating the HRBM so that the MMT receiving entity can buffer the data for some time before consumption and data buffered at the beginning can be consumed when the packets are not received in time.

Although FIG. 5 illustrates one example of a receiver buffer model 500 for simulating the receiver behavior at the sender side, various changes may be made to FIG. 5. For example, various components in FIG. 5 could be combined, further subdivided, or omitted and additional components could be added according to particular needs.

Figure 6:
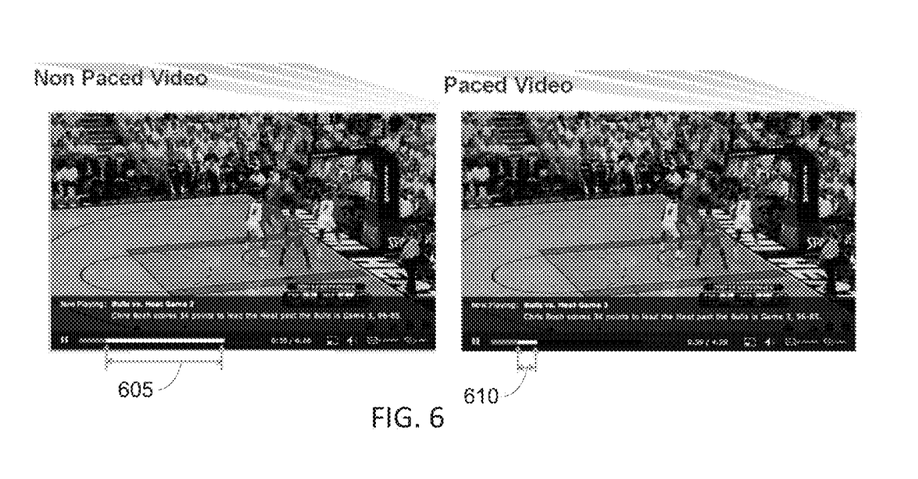
FIG. 6 illustrates an exemplary implementation using rate pacing for mobile video delivery according to various embodiments of the present disclosure.

FIG. 6 illustrates an exemplary implementation 600 using rate pacing for mobile video delivery according to various embodiments of the present disclosure.

Pacing is a technique for reducing data wasted at the client side in a push delivery system by adjusting the streaming bitrate based on the buffer status and playback. The left part of the FIG. 6 shows an example of cases that an MMTP sending entity delivered data in a bandwidth larger than that of media consumption so that the excessive amount of buffered data 605 is stored in an MMT receiving entity. As discussed in ISO/IEC 23008-1 AMD 2 MMT Enhancements for Mobile Environments, in many cases the users do not watch the video until the end so that such excessive data is not really consumed, in other words resources is wasted. To minimize such waste of resources, a pacing method is applied as shown in the right part of the FIG. 6. An MMT receiving entity informs an MMT sending entity the amount of data buffered 610 at the client so that an MMT sending entity can control the sending bandwidth.

Although FIG. 6 illustrates one example of an exemplary implementation 600 using rate pacing for mobile video delivery, various changes may be made to FIG. 6. For example, various components in FIG. 6 could be combined, further subdivided, or omitted and additional components could be added according to particular needs.

Figure 7:
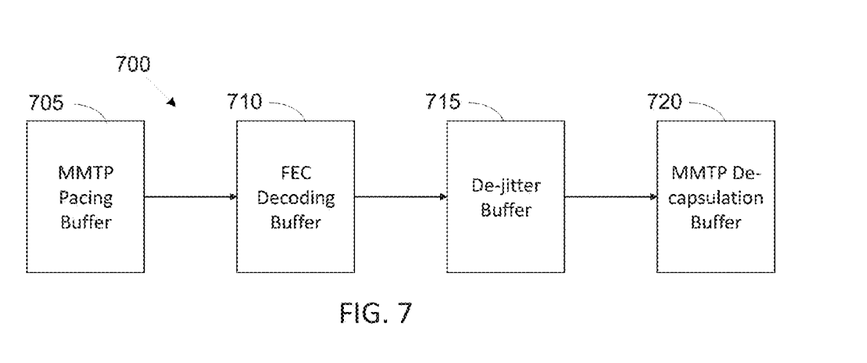
FIG. 7 illustrates a hypothetical receiver buffer model (HRBM) with a pacing buffer in accordance with various embodiments of the present disclosure.

FIG. 7 illustrates a hypothetical receiver buffer model (HRBM) 700 with a pacing buffer in accordance with various embodiments of the present disclosure. The HRBM includes an MMTP pacing buffer 705, an FEC decoding buffer 710, a de-jitter buffer 715 and an MMTP de-capsulation buffer 720. The FEC decoding buffer 710, de-jitter buffer 715, and MMTP de-capsulation buffer 720 function similarly to the FEC decoding buffer 505, de-jitter buffer 510, and MMTP de-capsulation buffer 515 illustrated in FIG. 5.

In consideration of incorporating a pacing buffer 705, a value of the fixed end-to-end delay of the MMTP HRBM (700) is set to a value of delay contributed by the FEC operation. Each MMTP packets are stored in the pacing buffer 705 for a specific time decided by a receiving entity 410 before any further processing. The amount of time for storing each MMTP packets are decided by a receiving entity 410 to maintain an amount of MMTP packets stored in the pacing buffer to a value of target_pacing_buffer_level of a pacing buffer status feedback (PSF) message and the delivery rate of the packets to the decoding buffer 710 to a value of the pacing_buffer_removal_rate of the pacing buffer removal rate (PRR) message. The value of a timestamp filed of each MMTP packet delivered to the FEC decoding buffer 710 is increased by an amount of time the packet is stored in the pacing buffer 705.

A PRR message provides information on the drain rate of the pacing buffer 705. The PRR message is signaled when the pacing buffer 705 is used by transmitting the PRR message to the sending entity 405. Once the PRR message is signaled, the MMT receiving entity 410 delivers the packets in the pacing buffer 705 to the FEC decoding buffer 710 at a rate specified in the message. Table 1 illustrates the PRR message syntax:

TABLE 1

PRR Message syntax

| Syntax | Values | No. of bits | Mnemonic |
|---|---|---|---|
| Pacing_Buffer_Removal_Rate ( ){ | | | |
|    message_id | | 16 | |
|    Version | | 8 | |
|    Length | | 16 | |
|    message_payload { | | | |
|       pacing_buffer_removal_rate | | 32 | |
|    } | | | |
|    Reserved | | 8 | |
| } | | | |

The message_id field indicates the identifier of the PRR message. The version field indicates the version of the PRR messages. An MMT receiving entity 410 uses this field to verify the version of the received PRR message. The length field indicates a length of the PRR messages, typically in bytes, counting from the first byte of the next field to a last byte of the PRR message. A value of '0' is not valid for the length field. The pacing_buffer_removal_rate field indicates a drain rate to deliver the MMTP packets from the pacing buffer 705 to the FEC decoding buffer 710.

As a size of the MMTP pacing buffer 705 and an amount of time for each MMTP packets are stored in the MMTP pacing buffer 705 are decided by an MMT receiving entity 410, an MMT receiving entity 410 sends the PSF messages to the sending entity 405 when requested by the sending entity 405 and at the frequency requested by the sending entity 405. An MMT receiving entity 410 tracks of the status of the MMTP pacing buffer level and decides the time for each MMTP packets to be sent, controlling the amount of excessive data stored at the MMTP pacing buffer 705. Table 2 illustrates the syntax for the PSF messages:

TABLE 2

PSF Message syntax

| Syntax | Values | No. of bits | Mnemonic |
|---|---|---|---|
| PSF_message ( ) { | | | |
|   message_id | | 16 | uimsbf |
|   version | | 8 | uimsbf |
|   length | | 16 | uimsbf |
|   message_payload { | | | |
|     num_sub_flows | | 8 | uimsbf |
|     for (i=0;i<N;i++) { | N | | |
|       current_pacing_buffer_level | | 32 | uimsbf |
|       target_pacing_buffer_level | | 32 | uimsbf |
|       last_received | | 32 | uimsbf |
|       free_buffer_space | | 32 | uimsbf |
|     } | | | |
|   } | | | |
| } | | | |

The message_id field including an identifier of the PSF message. For example, the message_id field could have a length of 16 bits. The version field indicates a version of the PSF message. The receiving entity 410 uses this field to check the version of a received message. For example, the version field could have a length of 8 bits. The length field indicates a length of the PSF message, typically in bytes, counting from a first byte of a next field to the last byte of the PSF message. The length of this field can be 16 bits and a value of '0' is not valid for this field. The current_pacing_buffer_level indicates an MMT sending entity 405 about an amount of the MMTP packets currently buffered in the pacing buffer 705. The target_pacing_buffer_level indicates to a sending entity 405 about the target amount of the MMTP packets buffered in the pacing buffer 705. A sending entity 405 adjusts the bandwidth allocated to the delivery of MMTP packets to achieve this target amount. The last received field indicates the sending entity 405 about the last received MMTP packet sequence number for a particular MMTP sub-flow. The pacing_buffer_free_space field indicates to a sending entity about an amount of available space of the pacing buffer 705 in bytes.

A measurement configuration message is transmitted from the sending entity 405 to the receiving entity 410 to indicate a request for a PSF message reporting the status of the pacing buffer. The measurement configuration message can also indicate to the receiving entity 405 a frequency for sending PSF messages. The flag to indicate a request for a PSF report is defined as "0000 0000 0000 1000." When this flag is set to 1 requests the receiving entity 410 to transmit PSF message about the current playback status to the sending entity 405.

Although FIG. 7 illustrates one example of a hypothetical receiver buffer model (HRBM) 700 with a pacing buffer in accordance with various embodiments of the present disclosure, various changes may be made to FIG. 7. For example, various components in FIG. 7 could be combined, further subdivided, or omitted and additional components could be added according to particular needs.

Figure 8:
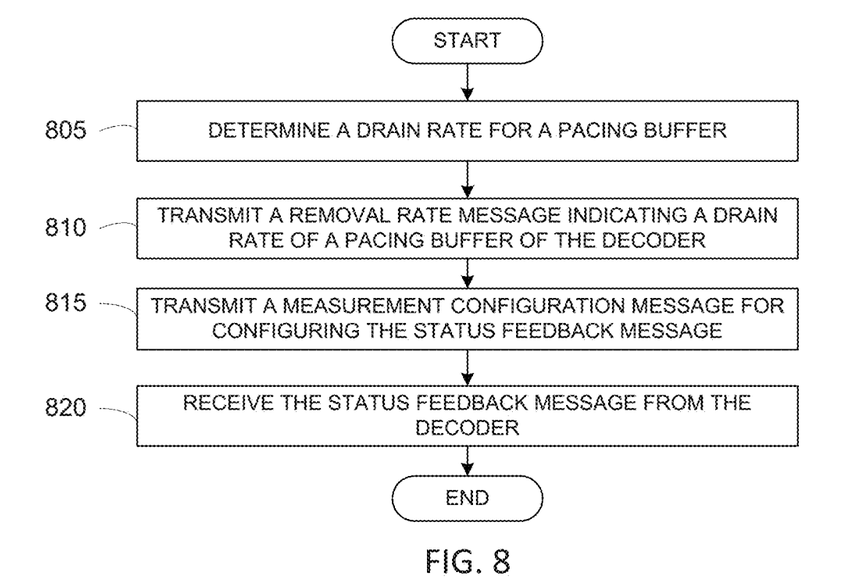
FIG. 8 illustrates a process for operating a sending entity in a transmission system in accordance with an illustrative embodiment of the present disclosure.

FIG. 8 illustrates a process for operating a sending entity in a transmission system in accordance with an illustrative embodiment of the present disclosure. For example, the process depicted in FIG. 8 may be performed by the server 200 in FIG. 2 or sending entity 405 in FIG. 4. The process may also be implemented by the sending entity 101 in FIG. 1.

In operation 805, the sending entity 405 determines a drain rate for a pacing buffer in a receiving entity 405. The receiving entity 410 can also determine a size of the pacing buffer based on an amount of packets or an amount of time in a video. The drain rate can be determined based on, for example, a size of the video, a size of the buffer, a rate of the data stream, etc. In certain embodiments, the use of a pacing buffer is signaled by the receiving entity 410.

In operation 810, the sending entity 405 transmits a PRR message indicating a drain rate of a pacing buffer of the decoder in response to receiving a signal indicating a pacing buffer. The PRR message indicates to the receiving entity 410 the drain rate at which packets are being sent to an FEC decoder 710.

In operation 815, the sending entity 405 transmits a measurement configuration message for configuring the PSF message. The measurement configuration message indicates to the receiving entity 410 to either send a PSF message or a frequency to send PSF messages. In certain circumstances, the configuration message can indicate an initial message to be sent at a certain time or factor. For example, the measurement configuration message can indicate to begin transmitting PSF message once the pacing buffer is a certain percentage full. The measurement configuration message can also indicate for the receiving entity 410 to transmit messages based on the certain thresholds. For example, the receiving entity is directed to transmit a PSF once the pacing buffer 705 is full or at a threshold that would indicate that the pacing buffer will be filled once the sending entity receives the PSF message. The receiving entity 410 can also be directed to transmit a PSF indicating that the pacing buffer is empty or at a threshold that indicates the pacing buffer 705 will be empty once the sending entity 405 receives the PSF. In other embodiments, the PSF message can be transmitted once the pacing buffer 705 falls below a threshold, after indicating a PSF message had been sent indicating that the pacing buffer 705 was full. For example, this threshold could be fifty to seventy five percent in order to guarantee that buffer will not cause the video to delay.

In operation 820, the sending entity 405 receives a PSF message from the decoder. The sending entity 405 controls the stream of data based on the information contained in the PSF, which could include the current pacing buffer level, the target pacing buffer level, the last received packet and the free buffer space.

Figure 9:
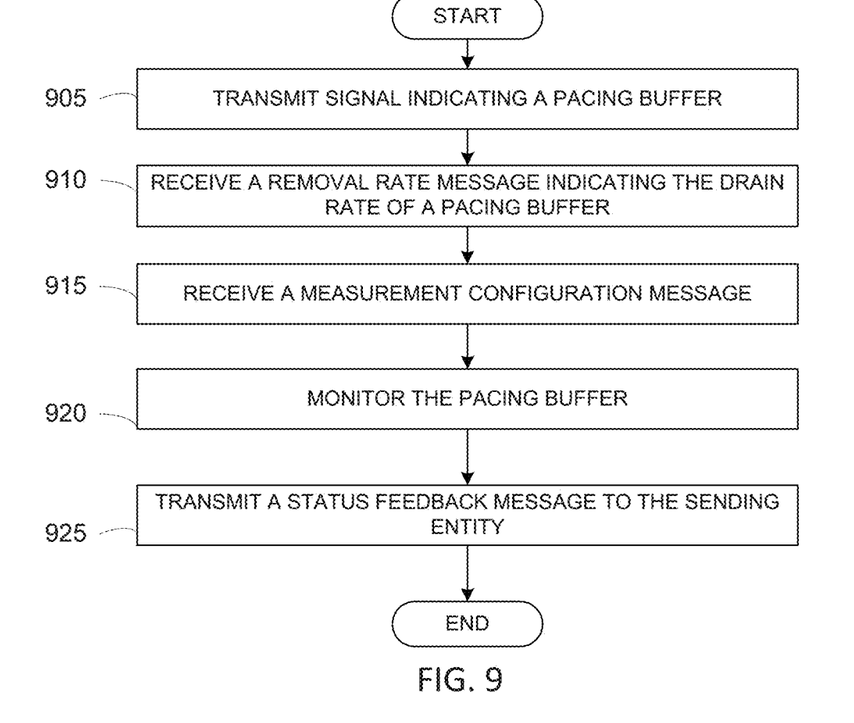
FIG. 9 illustrates a process for operating a receiving entity in a transmission system in accordance with an illustrative embodiment of the present disclosure.

FIG. 9 illustrates a process for operating a receiving entity in a transmission system in accordance with an illustrative embodiment of the present disclosure. For example, the process depicted in FIG. 9 may be performed by the client device in FIG. 3 or the receiving entity 410 in FIG. 4. The process may also be implemented by the receiving entity 110 in FIG. 1.

In operation 905, the receiving entity 410 transmits a signal to the sending entity 405 to indicate the use of a pacing buffer in the receiving entity 410 determines a drain rate for a pacing buffer 705. In certain embodiments, the receiving entity 410 can also determine a size of the pacing buffer based on an amount of packets or an amount of time in a video. The drain rate can be determined based on, for example, a size of the video, a size of the buffer, a rate of the data stream, etc.

In operation 910, the receiving entity 410 receives a PRR message indicating the drain rate of the pacing buffer to the sending entity 405. The PRR message indicates to the receiving entity 405 the drain rate at which packets are being sent to an FEC decoder 710.

In operation 915, the receiving entity 410 receives a measurement configuration message. The measurement configuration message indicates to the receiving entity 405 to either send a PSF message or a frequency to send PSF messages. In certain circumstances, the configuration message can indicate an initial message to be sent at a certain time or factor. For example, the measurement configuration message can indicate to begin transmitting PSF message once the pacing buffer is a certain percentage full. The measurement configuration message can also indicate for the receiving entity 410 to transmit messages based on the certain thresholds. For example, the receiving entity is directed to transmit a PSF once the pacing buffer 705 is full or at a threshold that would indicate that the pacing buffer will be filled once the sending entity receives the PSF message. The receiving entity 410 can also be directed to transmit a PSF indicating that the pacing buffer is empty or at a threshold that indicates the pacing buffer 705 will be empty once the sending entity 405 receives the PSF. In other embodiments, the PSF message can be transmitted once the pacing buffer 705 falls below a threshold, after indicating a PSF message had been sent indicating that the pacing buffer 705 was full. For example, this threshold could be fifty to seventy five percent in order to guarantee that buffer will not cause the video to delay.

In operation 920, the receiving entity 410 monitors the pacing buffer 705. Depending on the measurement configuration message received, the receiving entity 410 monitors or checks the current status of the pacing buffer 705. The status of the pacing buffer includes an amount of packets currently in the pacing buffer, a target amount of the packets buffered in the pacing buffer, a last received packet sequence number for a sub-flow, a last received packet sequence number for a sub-flow, and an amount of available free space of the pacing buffer.

In operation 925, the receiving entity 410 transmits a PSF message to the sending entity 405. The PSF message is sent based on the information provided in the configuration message received from the sending entity 405. The receiving entity 410 can also transmit the PSF message in cases where the sending entity 405 needs to adjust the data transmission, but has not been instructed by the configuration message. For example, the configuration message might only indicate a frequency for transmitting a PSF message, but the pacing buffer fills up between scheduled PSF messages. The receiving entity 410 can transmit a special PSF message in this case to indicate that the pacing buffer is full, even though the sending entity 405 did not require this PSF message in the configuration message.

Although FIGS. 8 and 9 illustrate examples of processes for sending and receiving entities in a transmission system, respectively, various changes could be made to FIGS. 5 and 6. For example, while shown as a series of steps, various steps in each figure could overlap, occur in parallel, occur in a different order, or occur multiple times.

Embodiments of the present disclosure recognize that MMTP has been developed to improve upon and replace existing transport protocols by providing a generic protocol, suitable for the delivery of media data. MMTP addresses delay tolerant applications as well as real-time low-delay applications, such as live streaming. In order to ensure that the MMTP protocol operates consistently across receivers and that the needed buffer space is made available by the clients, embodiments of the present disclosure provide methods and apparatuses to manage buffers for rate pacing, to estimate the required buffer space, and signal this information to the sending entity. This functionality is especially important for broadcast receivers where the receiving client is implemented in hardware (e.g. a set-top box).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoder for managing buffers for rate pacing, the decoder comprising:
   a memory;
   a transceiver configured to transmit and receive a signal; and
   processing circuitry operably connected to the memory and the transceiver, the processing circuitry configured to:
      receive, from a server, a removal rate message indicating a drain rate of a pacing buffer of the decoder; and
      provide received packets from the pacing buffer to a decoding buffer of the decoder according to the drain rate.

2. The decoder of claim 1, wherein the processing circuitry is further configured to:
   transmit, to the server, a status feedback message indicating a status of the pacing buffer.

3. The decoder of claim 2, wherein the status of the pacing buffer comprises:
   an amount of the packets currently buffered in the pacing buffer,
   a target amount of the packets buffered in the pacing buffer,
   a last received packet sequence number for a sub-flow, and
   an amount of available free space of the pacing buffer.

4. The decoder of claim 2, wherein the processing circuitry is further configured to receive, from the server, a measurement configuration message for configuring transmission of the status feedback message.

5. The decoder of claim 4, wherein the measurement configuration message includes a request for the decoder to transmit the status feedback message of the pacing buffer.

6. The decoder of claim 4, wherein the measurement configuration message includes a frequency for the decoder to transmit the status feedback message of the pacing buffer.

7. The decoder of claim 2, wherein the processing circuitry is further configured to transmit, to the server, a filled status feedback message when the pacing buffer is full.

8. The decoder of claim 7, wherein the processing circuitry is further configured to transmit, to the server, a status feedback message when an amount of packets drops below a threshold after the filled status feedback message has been sent.

9. A server for managing buffers for rate pacing in a decoder, the server comprising:
   a memory;
   a transceiver configured to transmit and receive signals; and
   one or more processors operably connected to the memory and the transceiver, the one or more processors configured to:
      transmit, to a decoder, a removal rate message indicating a drain rate of a pacing buffer of the decoder;
      transmit, to the decoder, a measurement configuration message for configuring transmission of a status feedback message,
   wherein the drain rate is a rate according to which received packets are provided from the pacing buffer of the decoder to a decoding buffer of the decoder.

10. The server of claim 9, wherein the one or more processors are further configured to, receive, from the decoder, the status feedback message indicating a status of the pacing buffer,
   wherein the status of the pacing buffer comprises:
      an amount of the packets currently buffered in the pacing buffer,
      a target amount of the packets buffered in the pacing buffer,
      a last received packet sequence number for a sub-flow, and
      an amount of available free space of the pacing buffer.

11. The server of claim 9, wherein the measurement configuration message includes a request for the decoder to transmit the status feedback message of the pacing buffer.

12. The server of claim 9, wherein the measurement configuration message includes a frequency for the decoder to transmit the status feedback message of the pacing buffer.

13. A method for operation of a decoder for managing buffers for rate pacing, the method comprising:
   receiving, from a server, a removal rate message indicating a drain rate of a pacing buffer of the decoder; and
   providing packets from the pacing buffer to a decoding buffer of the decoder according to the drain rate.

14. The decoder of claim 13, further comprises transmitting, to the server, a status feedback message indicating a status of the pacing buffer.

15. The method of claim 14, wherein the status of the pacing buffer comprises:
   an amount of the packets currently buffered in the pacing buffer,
   a target amount of the packets buffered in the pacing buffer,
   a last received packet sequence number for a sub-flow, and
   an amount of available free space of the pacing buffer.

16. The method of claim 14, further comprises receiving, from the server, a measurement configuration message for configuring transmission of the status feedback message.

17. The method of claim 16, wherein the measurement configuration message includes a request for the decoder to transmit the status feedback message of the pacing buffer.

18. The method of claim 16, wherein the measurement configuration message includes a frequency for the decoder to transmit the status feedback message of the pacing buffer.

19. The method of claim 14, further comprises transmitting, to the server, a filled status feedback message when the pacing buffer is full.

20. The method of claim 19, further comprising:
   transmitting, to the server, a status feedback message when an amount of packets drops below a threshold after the filled status feedback message has been sent.

* * * * *